US009560223B2

(12) United States Patent
Johnson et al.

(10) Patent No.: US 9,560,223 B2
(45) Date of Patent: Jan. 31, 2017

(54) PERSONAL PHOTOGRAPHER MOBILE APPLICATION (71) Applicant: Peerparazzi LLC, St. Paul, MN (US)

(72) Inventors: Damen Anthony Johnson, St. Paul, MN (US); Sean Elliott Gadson, St. Paul, MN (US)

(73) Assignee: Peerparazzi LLC, Saint Paul, MN (US)

(*) Notice: Subject to any disclaimer, the term of this patent is extended or adjusted under 35 U.S.C. 154(b) by 0 days.

(21) Appl. No.: 14/071,075

(22) Filed: Nov. 4, 2013

(65) Prior Publication Data

US 2014/0125823 A1 May 8, 2014

Related U.S. Application Data (60) Provisional application No. 61/722,542, filed on Nov. 5, 2012.

(51) Int. Cl.
*H04N 1/00* (2006.01)
(52) U.S. Cl.
CPC ...... *H04N 1/00413* (2013.01); *H04N 1/00137* (2013.01); *H04N 1/00148* (2013.01); *H04N 2201/3205* (2013.01); *H04N 2201/3253* (2013.01); *H04N 2201/3278* (2013.01)
(58) Field of Classification Search
None
See application file for complete search history.

(56) References Cited

U.S. PATENT DOCUMENTS

| 7,269,590 | B2 | 9/2007 | Hull et al. |
| 7,480,867 | B1 | 1/2009 | Racine et al. |
| 2003/0078968 | A1* | 4/2003 | Needham et al. ............ 709/204 |
| 2010/0013974 | A1* | 1/2010 | Gay ............................. 348/308 |
| 2010/0077017 | A1* | 3/2010 | Martinez et al. ............. 709/201 |
| 2011/0131085 | A1* | 6/2011 | Wey .......................... 705/14.16 |
| 2011/0307397 | A1 | 12/2011 | Benmbarek |
| 2012/0021829 | A1 | 1/2012 | Shoham et al. |
| 2012/0040745 | A1 | 2/2012 | Auterio et al. |
| 2012/0162468 | A1* | 6/2012 | Nozaki ................ H04N 1/2112 348/231.1 |
| 2012/0246266 | A1* | 9/2012 | Mallet et al. ................. 709/217 |

* cited by examiner

*Primary Examiner* — Mark T Monk
(74) *Attorney, Agent, or Firm* — Fredrikson & Byron, P.A.

(57) ABSTRACT

A photographic exchange network may allow individuals taking photographs to share those photographs with other individuals having their photograph taken. An example technique may include receiving an indication of a physical location of a first user and, responsive to receiving the indication of the physical location of the first user, determining at least a second user at the physical location of the first user. The example technique may also include transmitting information identifying the first user to a mobile device associated with the second user and then receiving an image of the first user from the mobile device associated with the second user.

18 Claims, 3 Drawing Sheets

PERSONAL PHOTOGRAPHER MOBILE APPLICATION

This application claims the benefit of U.S. Provisional Patent Application No. 61/722,542, filed Nov. 5, 2012, the entire contents of which are incorporated herein by reference.

TECHNICAL FIELD

This disclosure relates to photographic image sharing using computing devices and, more particularly, to location-based environments for taking and sharing photographic images.

BACKGROUND

The number of photographs taken in day-to-day life has grown as the number of portable electronic devices that include a camera has grown. For example, many people now carry a smart phone, PDA, or tablet computer, to name a few computing devices, that includes a camera for capturing an image of a surrounding environment. With ready access to this photographic equipment, individuals now frequently take photographs at a variety of functions such as sporting events, casual social gatherings, business meetings, and formal events such as weddings. A photograph can be an easy way to memorialize an activity and can help trigger remembrances of an event at a later date.

Unfortunately, most photographic equipment requires an operator to actually take a photographic image. As a result, the operator of the equipment is typically not in the photographs taken during the course of an event. For example, the owner of a camera or camera-equipped electronic device may take pictures all during the course of an event using the device. At the end of the event, the owner of the device may have a number of pictures of other attendees at the event but few pictures of himself or herself at the event. Likewise, other attendees of the event may have pictures of other guests at the event on their devices but lack pictures of themselves. While attendees can share pictures with one another, it is often difficult to match an individual in an image with a person taking the image to facilitate efficient exchange of a picture.

SUMMARY

In general, this disclosure describes techniques for sharing photographic images between a device carried by a person taking an image and a device associated with a person in the image. The disclosure also describes techniques for controlling access and retention of photographic images taken by one individual of another individual. In some examples, the techniques are used as part of a peer-recognition event environment in which different users are encouraged to take and share pictures with one another. For example, when a participant enters an environment in which the peer-recognition event is taking place, the participant may receive biographical information identifying all other event participants within the environment. The biographical information may identify other participants so that the individual receiving the information can select a particular participant for taking their picture. Other participants in the environment may also receive the entering individual's biographical information so that they can identify the individual for taking his or her picture. During the event, a participant may select another participating individual and take their picture. The picture may be sent automatically from the person taking the picture to the individual whose picture was taken based on the pre-selection of the individual. The person receiving the picture may then perform a variety of different actions such as deleting the picture, saving the picture for private viewing, posting the picture for friends to view, tagging the picture, or performing any other suitable action. Depending on the application, the person receiving the picture may have full control or "ownership" over the picture so that the person taking the picture does not retain a copy of the picture.

As one example, an individual may enter a location in which other individuals are participating in a location-based picture exchange event. The location may be a residential dwelling, a store, an office, a park, a sports venue, or any other suitable location. The individual entering the location may automatically enter the picture exchange event based on geolocation data received from a mobile electronic device (e.g., a phone) carried by the individual. Alternatively, the individual may enter the picture exchange event by manually checking-in to the location, thereby indicated the individual's presence at the location.

Upon entering the location where the picture exchange event is occurring, the individual may receive stored images and/or profiles of other event participants on a display screen of a mobile device carried by the individual. Other individuals already at the location may also receive a stored image and/or profile of the person entering the location. To participate in the event, one participant may select another participant's image or profile using the mobile device and then take a photograph of the selected person using the mobile device. The mobile device capturing the image may transmit the image to a different device associated with the person whose image was captured, such as a mobile phone carried by the person whose image was captured. In this manner, the location-based picture exchange environment can allow individual taking pictures to also have pictures that include themselves.

After transmitting the captured image, the mobile device of the photographer may or may not automatically delete (e.g., remove from storage) a copy of the captured image. For example, after transmitting the image from the mobile device capturing the image to the device associated with the person whose image was captured, the mobile device capturing the image may no longer retain or have access to the captured image. Instead, control over and access to the captured image may transfer to the person whose image was captured. The person whose image was captured may receive the image and, in different examples, decide to delete the image, save the image to a personal storage medium, or post the image on a social media website.

In some examples, the location-based picture exchange environment is integrated into a marketing campaign that rewards users for engaging in certain conduct. For example, the disclosed techniques may involve a server that hosts multiple users linked together in a photographic taking and sharing network where users can obtain different levels of rewards and/or earn different status in the network based on their conduct. Participants may be rewarded for taking a picture or having their picture taken at a certain location, while performing a certain activity, while wearing or using a certain item, or otherwise engaged with an identifiable brand. Rather than actively advertising products and services, the picture exchange environment may subtly advertise goods and services through the simple sharing of pictures. Depending on the structure of the picture exchange network, a participant may become a "celebrity" based on their points and/or status within the network. Other individuals may desire to take pictures of the "celebrity" and have their picture taken by the "celebrity."

In one example, a method is described that includes receiving, by one or more processors, an indication of a physical location of a first user and responsive to receiving the indication of the physical location of the first user, determining, by the one or more processors, at least a second user at the physical location of the first user. The method also includes transmitting, by the one or more processors, information identifying the first user to a mobile device associated with the second user and, subsequent to transmitting information identifying the first user, receiving, by the one or more processors, an image of the first user from the mobile device associated with the second user. The example specifies that the image is captured by the second user at the physical location.

In another example, a computer-readable storage medium is described that includes instructions that cause one or more processors to receive an indication of a physical location of a first user and, responsive to receiving the indication of the physical location of the first user, determine at least a second user at the physical location of the first user. The computer-readable storage medium also includes instructions that cause the one or more processors to transmit information identifying the first user to a mobile device associated with the second user and, subsequent to transmitting information identifying the first user, receive an image of the first user from the mobile device associated with the second user. According to the example, the image is captured by the second user at the physical location.

In another example, a method is described that includes transmitting, by one or more processors, an indication of a physical location of a first user and, responsive to transmitting the indication of the physical location of the first user, receiving, by the one or more processors, information identifying at least a second user at the physical location of the first user. The method also includes, subsequent to receiving information identifying the second user, receiving, by the one or more processors, an image of the first user from a mobile device associated with the second user, where the image is captured by the second user at the physical location.

The details of one or more examples are set forth in the accompanying drawings and the description below. Other features, objects, and advantages will be apparent from the description and drawings, and from the claims.

DETAILED DESCRIPTION

In general, this disclosure is directed to devices, systems, and techniques for sharing photographic images between networked participants. As described in some examples herein, the techniques involve a system that supports a network with multiple users. Each user may have a stored profile that contains biographical information about the user, images of or by the user, and the user's status within the social network. For example, each user may have a status within the social network that is based on the level and type of participation by the user in network activities. As a networked user moves to different geographical locations, the user may manually or automatically make their presence known to other network participants at the same location. For example, a stored image of the networked user may appear on other network participant's portable electronic devices (e.g., mobile phones, tablet computers) as the networked user arrives at the same location as the other participants. Similarly, images of the other networked users at the location may appear on the arriving individual's portable electronic device as the user arrives at the location. Accordingly, all networked individuals present at a particular location may have images of all other networked individuals (or a subset thereof) at that particular location displayed on their mobile device.

Networked individuals may capture and share photographic images within the networked environment using their portable electronic devices. For example, each networked user may have an application on their mobile device that allows the user to select an image of another particular networked individual or images of a group of particular networked individuals at the location. The user can then take a picture of the particular networked individual or group of networked individuals using their camera-enabled mobile device. A computing device supporting the network may receive the photograph from the mobile device of the person taking the photograph, associate the photograph with a networked individual who is in the photograph, and transmit the photograph to the individual who is in the photograph. In turn, the networked individual whose picture was taken may receive the photograph at a display of their mobile device or display of another device associated with the user. The networked individual can then delete, store, share, or otherwise manipulate the photograph. By distributing photographs from picture takers to individuals whose pictures have been taken, the network environment facilitates efficient information share.

Figure 1:
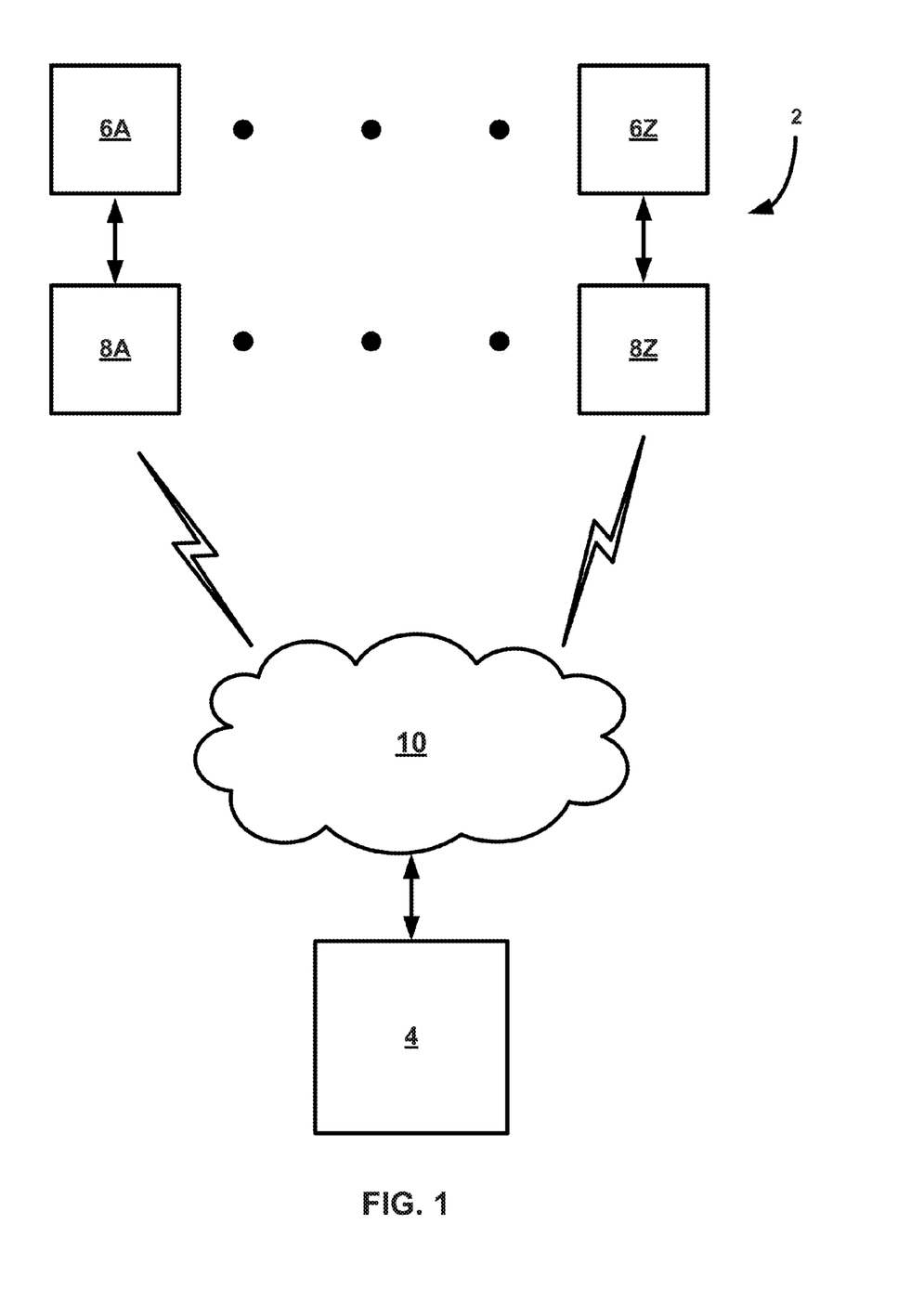
FIG. 1 is a block diagram illustrating an example network-based environment for capturing and exchanging photographic images.

FIG. 1 is a block diagram illustrating an example network computing environment 2 in which a photographic exchange network server 4 facilitates photographic image sharing among networked users. As described herein, photographic exchange network server 4 provides a user interface with which users 6A-6Z (collectively "users 6") may interact to exchange photographs, receive and share user profiles, establish and earn rewards, and exchange other information related to the networked environment. A user may be, for example, a participant in a photo exchange game, an individual, a business, an employee, an employer, a family member, a friend, a co-worker, or any other person taking a picture or whose picture is taken. As shown, users 6 communicate with photographic exchange network server 4 via user devices 8A-8Z (collectively "user device 8") over a network 10. Network 10 is in communication with and enables communication between user devices 8 and photographic exchange network server 4.

User devices 8 may include virtually any computing device capable of receiving and sending information over a network, such as network 10, to and from another computing device, such as photographic exchange network server 4, each other, and the like. User devices 8 may be configured to take photographic images and/or receive photographic images. For example, user devices 8 may include a photographic lens and image capture hardware/software for taking photographic images and/or a display screen for displaying captured photographic images. User devices 8 may include devices that typically connect using a wired communication medium such as personal computers, multiprocessor systems, microprocessor-based or programmable consumer electronics, network PCs, and the like. User devices 8 may also include devices that typically connect using a wireless communication medium such as cell phones, smart phones, tablet computers, and integrated devices combining one or more of the preceding devices, or virtually any mobile device, and the like. In one example, each user device of user devices 8 is portable electronic device such as a mobile phone and/or tablet computer that includes a camera and is configured to communicate over a wireless medium.

Each user device within user devices 8 may include an application (e.g., a browser application) that is configured to receive and to send data (e.g., data representative of a photographic image) to photographic exchange network server 4. The application may be configured to receive and display graphics such a photographic image, text, multimedia, and the like. For example, each user device within user devices 8 may be configured to dynamically display a plurality of photographic images in series to form a video representation of a scene. User devices 8 may be further configured to receive a message from another computing device employing another mechanism, including, but not limited to email, Short Message Service (SMS), Multimedia Message Service (MMS), instant messaging (IM), internet relay chat (IRC), and the like.

User devices 8 may also be configured to enable a user to receive other users' biographical profiles (e.g., from photographic exchange network server 4), share captured and/or received photographs with individuals within or outside of the networked environment 2, and edit captured and/or received photographs by deleting, filtering, tagging, or otherwise processing the photographs. Data captured, received, and generated via user devices 8 may be stored on a user's device, a remote location such as photographic exchange network server 4, or a combination of user devices 8 and a remote location such as photographic exchange network server.

In some examples, a single user is associated with a single user device of user devices 8. In other examples, a single user is associated with multiple user devices of user devices 8. The multiple user devices may function, in combination, to perform the functions attributed to a single user device of user devices 8 in this disclosure. For instance, in one example, a user device is a mobile phone associated with a particular user that communicates via a wireless medium and includes a camera for taking photographic images and a display screen for displaying received photographic images. In another example in which a user is associated with multiple user devices 8, a user may have a digital camera that is configured to communicate with a computer via a wired medium which, in turn, includes a display screen for displaying received photographic images. Other configurations and combinations of user devices 8 are possible, and it should be appreciated that the disclosure is not limited in this respect.

Network 10 is configured to couple one computing device to another computing device to enable the devices to communicate together. Network 10 is enabled to employ any form of computer readable media for communicating information from one electronic device to another. Also, network 10 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. Communication links within LANs may include twisted wire pair or coaxial cable, while communication links between networks may utilize analog telephone lines, full or fractional dedicated digital lines, Integrated Services Digital Networks (ISDNs), Digital Subscriber Lines (DSLs), wireless links including cellular and satellite links, or other communications links. Furthermore, remote computers and other related electronic devices may be remotely connected to either LANs or WANs via a modem and temporary telephone link.

One example configuration of photographic exchange network server 4 is described in more detail below in respect to FIG. 2. Briefly, however, photographic exchange network server 4 may include any computing device or combination of computing devices capable of connecting to network 10 to receive data from user devices 8, transmit information to user devices 8, or otherwise control interaction and exchange of photographs between users 6. Devices that may operate as photographic exchange network server 4 include personal computers, desktop computers, multiprocessor systems, microprocessor-based or programmable consumer electronics, network PCs, servers, and the like.

During operation of network computing environment 2, users 6 may interact with user devices 8 to capture, send, and/or receive photographic images and related or other information via network server 4. User devices 8 and network server 4, either alone or in combination, may determine a physical location of each user of users 6 within a real-world physical environment. Based on the determined physical locations of user 6, network server 4 or another computing device communicatively coupled to the network may identify a certain group of users 6 (e.g., two or more users of users 6) as being within a predefined physical proximity of one another that would enable the users to take and share photographic images of one another. The predefined physical proximity may be stored in a memory associated with server 4 or another computing device and, in different examples, can be a set distance (e.g., less than 1000 feet, less than 500 feet, or less than 100 feet), a same enclosed physical structure (e.g., a same commercial structure such as a standalone store or a store in a mall, or a same residential structure such as a standalone house or unit in a multiunit building), or a same geographical region (e.g., a neighborhood, a park).

To inform each user of users 6 determined to be with a suitable physical proximity of one another for taking and/or receiving photographic images, each of the users may receive or access biographical information for all other users within the physical proximity (or a given subset of users within the physical proximity). For example, each user of users 6 may have a user profile that includes an image, a physical description, and/or other biographical information. The user profiles may be stored on network server 4 or another computing device communicatively coupled to the server. Upon determining which users are within physical proximity of one another for taking and/or receiving photographic images, network server 4 or another computing device communicatively coupled to the server may transmit to each user (e.g., a user device associated with each user) the user profile of all other users (or a subset thereof) within their physical proximity or otherwise allow each user to access the user profiles. This can allow each user of users 6 to know which other individuals within their physical proximity are part of network computing environment 2 for capturing and sharing photographic images with one another.

To exchange photographs within network computing environment 2, a particular user may physically identify another individual included in the network and then select that individual for exchanging a photograph. For example, the particular user may use a touch screen or other input device on his user device to select the identified individual (e.g., select a displayed image or other identifier of the individual). The user may further interact with his user device to take a photographic image of the identified individual or an image that is desired to be shared with the identified individual. In some examples, the user is prompted via their user device to accept, delete, or otherwise modify the captured photograph before the photograph is transmitted to photographic exchange network server 4. In other examples, the captured photograph automatically transmits to photographic exchange network server 4 upon being taken by the user's device.

Network server 4 may receive from a user device associated with the individual taking the picture an indication of the other individual whose picture is being taken. For example, in response to a picture taker selecting via their mobile device another individual whose picture is to be taken, network server 4 may receive from the picture taker's user device data identifying the selected individual. Network server 4 may further receive a photograph from the picture taker's device corresponding to the selected individual. Network server 4 or another computing device communicatively coupled to the network server may associate the individual whose profile was selected by the picture taker with the photograph received from the picture taker. In some examples, network server 4 or another computing device further stores the received photograph in memory accessible by the individual whose user profile was selected by the picture taker (e.g., a person whose picture was taken). In some additional examples, network server 4 or another computing device transmits the picture to a user device associated with the individual whose profile was selected by the picture taker.

Upon receiving and viewing the photograph, the individual whose profile was selected by the picture taker can perform a number of different actions. In different examples, the individual can interact with his user device to delete the photograph, save the photograph, tag the photograph with information, post or otherwise share the photograph (e.g., to a blog, social networking site, or other internet-accessible location), or perform any other suitable action with the photograph. In some examples, the picture taker still retains (e.g., stores) a copy of the photograph on his device and/or can access a copy of the photograph via photographic exchange network server 4. In other examples, network computing environment 2 is configured so that the picture taker does not have access and/or control over the photograph after the photograph is transmitted from the picture taker to network server 4. In such an example, the individual whose user profile was selected by the picture taker may receive access and/or control over the photograph when the photograph is transmitted from the picture taker to network server 4.

To facilitate physical identification of different users 6 within network environment 2, photographic exchange network server 4 may store a user profile created by or for each user of users 6. User information associated with each user may include any information about the respective user that the user desires to make accessible to other users of the network. For example, user information may include a name and/or an alias, a representative image (e.g., a stored photographic image), a physical description (e.g., height, weight, skin and hair color) contact information, a status of the user within the network (e.g., a celebrity status) and/or other information regarding the respective user. User information may or may not be configured to support a self-description page (also referred to as a "user profile page") for each user, which may be displayed as a web page or in other form. In some examples, user information may include a list of friends of the user. For example, photographic exchange network server 4 may associate a user profile with a community of other users of the network. Example communities include communities containing friends of the user, family members of the user, co-workers of the user, and the like. In some examples, each user of users 6 can control the communities to which they belong, the amount of personal informal shared on their user profile page in each community, and the like. Network server 4 may enable users 6 participating in the network to limit sharing of photographs and sharing of biographic information to only those other individuals within the user's communities. Network server 4 may enable users 6 to interact with each other in any number of ways beside sharing photographic images including, for example, blogging, discussion groups, email, non-photographic image file sharing, instant messaging, chat, and/or other techniques.

To establish a user profile for each user associated with photographic exchange network server 4, user information for each user may be actively provided by the user, collected from user, provided from some other network, system or database that aggregates such data, or by any combination of the foregoing. User information may be included in a file or other data structure. Each element of user information may be one or more data fields, data records, or other type of data entry in a data structure. For example, user information stored in a profile for a user may include user identity data, such as gender, age, race, name, a status of the user or member (e.g., an online status or a non-online related status), image information (such as a filename for a picture, avatar, or other image representative of the user), and/or other information associated with the user's identity. User identity information may also include e-mail addresses, login names and passwords.

Engagement with the photographic exchange network by a user and between users may be facilitated by photographic exchange network server 4. FIG. 2 is a block diagram illustrating an arrangement of components of an example server 20, in accordance with one aspect of the present disclosure. Server 20 may correspond to photographic exchange network server 4 of FIG. 1. FIG. 2 illustrates only one particular example of server 4, however, and other example configurations of server 4 may be used. Further, although server 20 is illustrated as a single server device, server 20 may be realized by a single computing device or a plurality of cooperating computing devices which, in combination, perform the functions attributed to server 20 herein.

Figure 2:
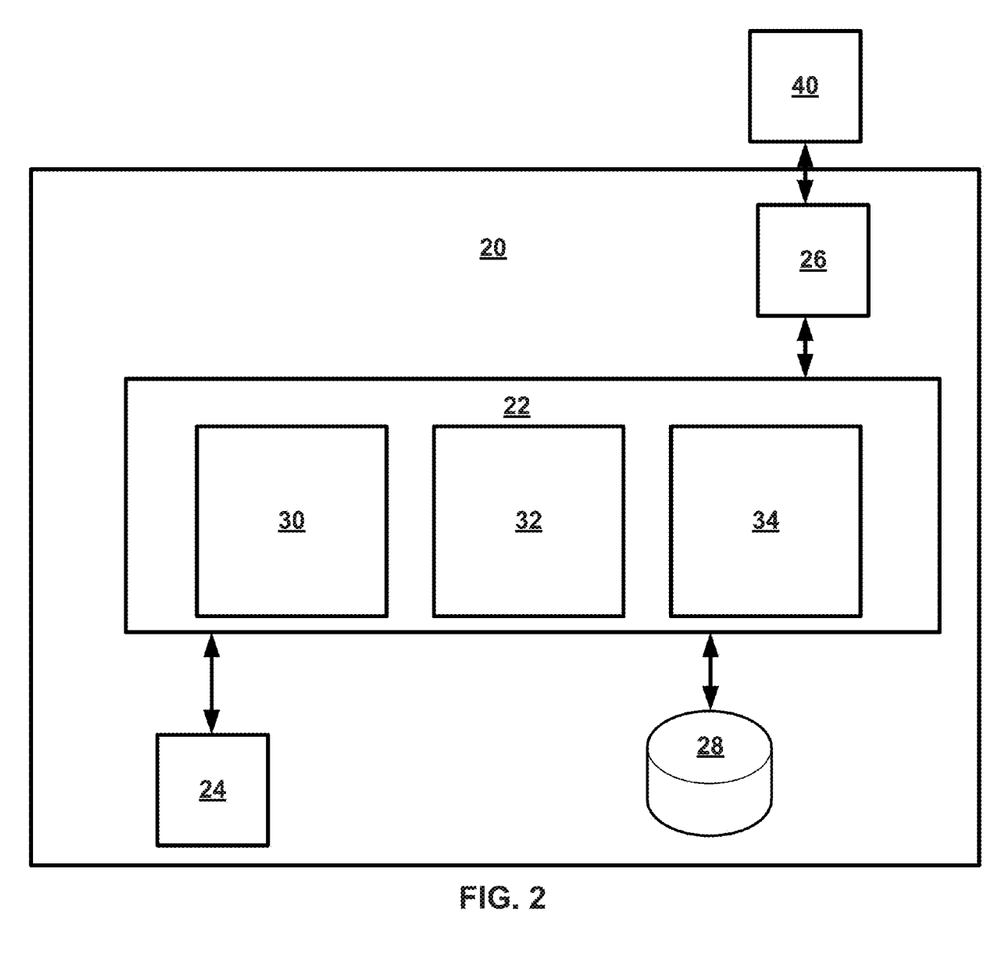
FIG. 2 is a block diagram illustrating an example arrangement of components of an example server that may be used in the network-based environment of FIG. 1.

In the example of FIG. 2, server 20 includes control unit 22, network interfaces 24, administrator interface 26, and database 28. Control unit 22 includes a user location and association module 30, rewards and status module 32, and a photographic exchange module 34. Administrator interface 26 allows an administrator 40 to configure server 20.

Control unit 22 may include any combination of hardware, software, and or firmware for performing the functions attributed to control unit 22. For example, control unit 22 may include a computer-readable storage medium encoded with instructions for user location and association module 30, rewards and status module 32, and photographic exchange module 34, as well as a processor that executes the instructions. In another example, control unit 22 may include one or more microprocessors, digital signal processors (DSPs), application specific integrated circuits (ASICs), field programmable gate arrays (FPGAs), or any other equivalent integrated or discrete logic circuitry, as well as any combinations of such components. Similarly, any or all of user location and association module 30, rewards and status module 32, and photographic exchange module 34 may be functionally integrated.

Network interfaces 24 receive and output data over a network, such as the Internet. In one example, one of network interfaces 24 may correspond to an interface for receiving data from user devices 8. For example, one of network interfaces 24 may correspond to an interface for receiving data from a telemetry module of a user device. In any case, input interfaces of network interfaces 24 receive data indicative of a photographic image captured by a device used by a user. Output interfaces of network interfaces 24 may, in various examples, include one or more interfaces for outputting data to user devices 8, including data indicative of a photographic image captured by the device of one user and transmitted to a device of a different user. Output interfaces of network interfaces 24 may also output data indicating the existence of a challenge or opportunity to earn status points for performing certain actions within network environment 2 (FIG. 1), outputting data indicating that a user has earned a certain status based on their participation in the network environment, or the like. In some examples, input and output network interfaces 24 may be functionally integrated, while in other examples, input and output interfaces may be separate interfaces of network interfaces 24. For example, network interfaces 24 may include one or more network interface cards (NICs) configured to communicate over, for example, Ethernet, transmission control protocol (TCP), Internet protocol (IP), asynchronous transfer mode (ATM), or other network communication protocols. In some examples, server 4 may include a plurality of either or both input and output interfaces.

User location and association module 30 executing on control unit 22 may receive data indicative of the physical locations of each of the different users associated with the network and determine which users are within physical proximity of one another such that the users should be grouped together for sharing photographic images. The data indicative of the physical location of each of the different users may be generated and/or obtained from a variety of different sources. In some examples, at least one and optionally all of the users carry user devices 8 (FIG. 1) that is configured to determine a physical location of the user and transmit the determined physical location to user location and association module 30 executing on control unit 22.

For example, each user device of user devices 8 may determine their respective locations to generate location information that identifies physical locations of the devices within two- or three-dimensional space. To accomplish this location determination, user devices 8 may include global positioning system (GPS) receivers that receive signals from the GPS that each device uses to generate latitude and longitude coordinates (or "GPS coordinates") that identify a geographical location of the device (i.e., a position of the device on the surface of the Earth). In other examples, user devices 8 use alternative techniques to determine their respective locations and to generate location information. For example, user devices 8 may use an identifier for a base station with which a host exchanges wireless signals as a physical location value. Various base stations of a cellular network cover different locations and thus a base station identifier correlates to a physical location for mobile devices served by the base station identifier. As further examples, user devices 8 may determine a Wi-Fi connection location identifier, GSM localization information, time difference of arrival (TDOA) information, or altitude data and include such information within location information. As still further examples, user devices 8 may use a peer-to-peer location service provided by network 2 to determine a location.

In some examples, user devices 8 carried by each user automatically (e.g., without user input) determines its location to generate location information and transmits the location information to server 20. In other examples, a user may interact with a user device to input data or otherwise allow the user device to determine its physical location. For instance, user devices 8 may have a user interface that allows a user to enter a location as, for example, a city and state, a street address, or a building floor. In response to receiving the location information from the user, the user device may transmit the location to user location and association module 30.

As another example, a user may interact with an application (e.g., on a user device carried by the user) that determines the user's location and transmits the location to server 20. Example applications include social networking sites (e.g., Facebook, Twitter), location tracking sites (e.g., Foursquare, Google Latitude), location reservation sites (e.g., OpenTable, Expedia), and the like. As an example, a user may enter a store and access Foursquare (e.g., "check in") using a user device carried by the user or any other device within the store to indicate the user's physical presence in the store. In response to accessing Foursquare, Foursquare may transmit the user's location to user location and association module 30 executing on control unit 22. As another example, a user may query a search engine (e.g., Google or Yahoo) that has information that identifies the physical location of the user. In turn, this physical location information can be transmitted to server 20.

Independent of the specific technique by which a user's physical location is determined, information indicative of the user's location can be transmitted over network 10 (FIG. 1) and received by server 20. At server 20, user location and association module 30 may store user device identities and location information using an associative data structure that associates identities with the corresponding location information. For example, user location and association module 30 may store a user device identity and corresponding location information to a database table that associates the identity and the location information. In this way, user location and association module 30 may store updated location information for each of user devices 8. User location and association module 30 may periodically receive and update the stored location information, for example, as user moves to different physical locations and/or a user interacts with an application to indicate that they have changed physical location.

Responsive to receiving physical location information from each of the plurality of users 6, user location and association module 30 may associate different users into different groups based on their physical location. By associating different users based on their physical location, user location and association module 30 may limit the number of individuals indicated to a particular user as being part of network environment 2 to only those individuals the user most likely to encounter within their physical proximity. Thus, rather than having to search through all individuals joined in network environment 2 to determine whether a particular individual is part of the network for purposes of photographic image sharing, user location and association module 30 can associate a user with other networked individuals in their physical proximity to enable the user to quickly determine whether someone in their physical proximity is part of the network.

User location and association module 30 may associate different users into different groups based on their physical location and association rules stored in computer-readable memory. The association rules may dictate, for example, that different users be associated into a group together if the users are within a set distance of one another (e.g., less than 1000 feet, less than 500 feet, or less than 100 feet), in a same enclosed physical structure (e.g., a same commercial structure such as a standalone store or a store in a mall, or a same residential structure such as a standalone house or unit in a multiunit building), or a same geographical region (e.g., a neighborhood, a park). The foregoing association rules are merely examples, however, and it should be appreciated that the disclosure is not limited in this response.

In addition to or in lieu of configuring user location and association module 30 to associate different users based on stored association rules, user location and association module 30 may receive instructions from a user device indicating that certain individuals should be grouped together. For example, an individual may transmit instructions to user location and association module 30 indicating that a group of friends, a group of co-worker, a group of family members, a group of event attendees, or any other suitable groups should be associated together within network environment 2. User location and association module 30 may receive the instructions and associate the group of individuals together for photographic image sharing independent of the physical location of each individual of the group. Alternatively, user location and association module 30 may apply the received grouping instructions in combination with predefined user association rules. For instance, in the example of an association rule where users are only associated together when the users are within a set distance of one another, user location and association module 30 may apply the instructions identifying which individuals should be group together by associating individuals only if they are both part of the identified group and within the set distance. In such an example, user location and association module 30 may exclude other networked individuals within the set distance from being associated because the individuals are not part of the identified group.

Independent of the specific parameters by which different individuals may be associated together, user location and association module 30 may store the associations in data structures identifying the different individuals as being part of different associations. In addition, to inform users 6 of other individuals with whom they are associated, user location and association module 30 may transmit data to user devices 8 identifying the other individuals with whom a particular user is associated. The data may be in the form of a user profile, an individual's stored image (e.g., a head shot), or other biographical information identifying each other individual with whom a particular individual is associated. In some examples, the data is received by a user device carried by the particular individual and displayed on a display of the user device. For example, a particular user may receive at a user device (e.g., a mobile phone) images of all other individuals with whom the user is associated. The user device may then display the images so that the user can compare the images to individuals within their physical proximity for determining which individuals is part of networked environment 2. In some examples, user location and association module 30 automatically transmits data to user devices 8 identifying the other individuals with whom a particular user is associated upon determining the associations. In other examples, user location and association module 30 is configured to transmit the data in response to a user request for such data. A user may place such a request, for example, by interacting with an application such as a web browser application on a user device.

To incentivize users 6 to take and share photographic images within networked environment 2, server 20 may include rewards and status module 32. Rewards and status module 32 may issue reward opportunities to a user to incentivize the user to perform certain actions. A reward opportunity may be a special reward (e.g., number of points, grade, etc.) that is offered to a user and that is earned by the user if the user performs a corresponding opportunity action. By completing an action required by a reward opportunity, the user can earn the reward associated with the opportunity.

Rewards and status module 32 may issue reward opportunities that encourage users 6 to engage with network environment 2. As examples, rewards and status module 32 may issue rewards when users perform any one or more of the following example actions: provide their physical location and indicate a willingness to participate in the photographic sharing network (e.g., by checking into a location), take a photograph, send a photograph to another user, receive a photograph from another user, manage a received photograph (e.g., by filtering, tagging, posting, deleting the photograph), associate with another user in the network having a certain status, or performing other user engagement activity. Different levels or amounts of rewards may be provided depending on the type of activity performed by the user. For example, a user may receive a first level or amount of rewards for providing their physical location and a second level or amount of rewards greater than the first for taking and sharing a photograph. As another example, a user may receive a first level or amount of rewards for receiving a photograph from another user and a second level or amount of rewards greater than the first for posting the photograph. In general, rewarding users for engaging in network activities may encourage users to increase their use of the network and thereby grow the volume photographs exchanged on the network.

Rewards and status module 32 may issue reward opportunities that encourage users to interact with various goods or service. For example, rewards and status module 32 may issue a reward opportunity for having an individual take a picture or have their picture taken with a certain good (e.g., a brand or article of clothing, a brand of food or drink, a brand of an electronic device), while at a certain location (e.g., a particular store, a particular restaurant), or while performing a certain action (e.g., attending a concert, show, or sporting event). An advertiser associate with the good or service spotlighted by the reward opportunity may pay for the reward opportunity, generating advertising revenue that can help support the creation and operation of network environment 2. Further, unlike an advertising campaign that directly markets a good or service to an individual, photographic exchange network environment 2 may cause individuals to interact with goods or services and then share those interactions with other contacts via photograph sharing, providing a more engaging and subtle advertising opportunity for marketers.

Rewards and status module 32 may issue a reward opportunity in response to user input (e.g., from administrator 40) establishing an activity required to be performed to earn the reward. Rewards and status module 32 may issue a reward opportunity by sending a message to a user device (e.g., via network interfaces 24), displaying the reward opportunity to the user (e.g., via user interface accessible by a user device) so that the user sees the opportunity when they access the network, or the like. A reward opportunity may be issued for a particular user, for a group of users (e.g., a community of users), or for all users of the network.

After issuing a reward opportunity, rewards and status module 32 may receive data indicating whether a user performed an activity required to earn a reward. For example, rewards and status module 32 may receive data indicating whether a user has provided their physical location, taken a photograph, sent a photograph to another user, received a photograph from another user, managed a received photograph, or performed other user rewardable engagement activity. As another example, rewards and status module 32 may determine if a user has taken or received a photograph at a certain location or while interacting with a good or service in way mandated by a reward opportunity for earning a reward.

In some examples, rewards and status module 32 performs image analysis on a photograph received from a picture taker and/or transmitted to another individual to determine if the picture taker and/or individual whose picture was taken was interacting with a good or service as required by a reward opportunity. For example, rewards and status module 32 may perform image analysis on a photograph to determine if a certain individual was present in the photograph (e.g., by comparing facial features against a database) and/or if a certain good was present in the photograph (e.g., by comparing aspects of the image to a database that contains an image of the good). In other examples, rewards and status module 32 determines the location at which an image was taken and/or received by a user device and compares the location to any location requirements set out in a reward opportunity.

Rewards and status module 32 may determine if a user has completed a reward opportunity and, if so, issue the reward to the user. For example, rewards and status module 32 may issue a reward by increasing a cumulative number of rewards points stored for the user, e.g., in database 28. Depending on the configuration of network environment 2, different reward levels or points earned by a user may provide different user benefits.

In some examples, each user participating in photographic exchange network environment 2 is assigned a status based on the reward level or points accumulated for the user. The status may be associated with a user profile stored for each user. The status may categorize individuals into different grades (e.g., A, B, C, D), different colors (e.g., platinum, gold, silver), or any other suitable status categories. In one example, individuals are categorized into celebrity status level. A celebrity status level may indicate an individual's relative celebrity among networked participants of the photographic exchange and may also indicate an individual's relative propensity to photograph or be photographed. Example celebrity status levels include A-list celebrity, B-list celebrity, C-list celebrity, D-list celebrity, super celebrity, celebrity, unknown, anonymous, and the like.

To incentivize individuals to achieve a higher celebrity status level in such examples, rewards and status module 32 may issue reward opportunities that provide greater rewards for photographing or being photographed with an individual in a higher celebrity status level than a comparatively lower celebrity status level. For example, rewards and status module 32 may issue 1000 points for photographing or being photographed by an A-list celebrity, 500 points for photographing or being photographed by a B-list celebrity, 100 points for photographing or being photographed by a C-list celebrity, and 50 points for photographing or being photographed by a D-list celebrity. In some examples, individual's achieving a certain celebrity level may be issued gift certificates, coupons, free goods or services, or similar status benefits. In some additional examples, other users associated with the individual achieving the celebrity level (e.g., other users networked with the individual in the photographic sharing network) may also receive a reward when the individual achieving the level receives a reward. For example, when an individual reaches an A-list celebrity status and receives reward(s) based on that status, a user at a lower level (e.g., a B-list celebrity) may also receive reward(s) based on their affiliation with the individual. The user at the lower level will likely receive lower rewards than the individual at the higher celebrity status. This type of reward scheme can reward users for being part of an entourage of an individual with a higher level celebrity status.

Photographic exchange module 34 executing on control unit 22 may receive a photograph from a user device of a picture taker and transmit the photograph to a user device of a picture receiver. The picture receiver may be an individual identified by the picture taker as being a person in the picture. For example, during operation of the network, user location and association module 30 may transmit data to user devices 8 identifying the other individuals with whom a particular user is associated. In response to receiving this information, a picture taker may select a particular individual with whom they are associated and who they have visually identified as being within their physical proximity. For example, a user may touch a touch-screen display on a mobile phone carried by the user to select a particular individual from multiple individuals displayed on the mobile phone screen. The picture taker may then take a photograph of the selected individual by engaging a camera function on their user device. In some examples, the photograph is automatically transmitted to photographic exchange module 34 upon capturing the image. In other examples, the picture taker may be able to view the image on their user device, delete the picture, or otherwise modify the picture (e.g., filter, crop) before the photograph is transmitted to photographic exchange module 34. In either set of examples, and depending on the configuration of network environment 2, a copy of the photograph may or may not be retained by the photo taker on their user device. In instances in which the network is configured so that the picture taker does not retain a copy of the images they capture, the image may be controlled and "owned" by the individual receiving the image.

In response to receiving the photograph image from the device of the picture taker, photographic exchange module 34 may determine the individual to whom the image should be transmitted. For example, photographic exchange module 34 may receive an indication of the selection made by the picture taker of the individual who the picture taker was going to photograph. Photographic exchange module 34 may or may not also associate a photographic image received from the picture taker with the selection. In either case, photographic exchange module 34 may identify a user device associated with an individual selected by the picture taker and transmit the photographic image received from the picture taker to the individual. In some examples, photographic exchange module 34 stores the photographic image in memory such as database 28.

The individual receiving the photographic image at their user device may view the image and may or may not modify the image. In some examples, the individual may filter the image, crop the image, or otherwise manipulate the image by interacting with their user device. In some additional examples, the receiving individual may be presented with options on the user's device to delete the image, to save the image, and/or share the image (e.g., via e-mail, a different social network). For example, server 20 may issue a prompt to the user device of the individual receiving the photographic image prompting the user to at least one of keep the image or discard the image.

Figure 3:
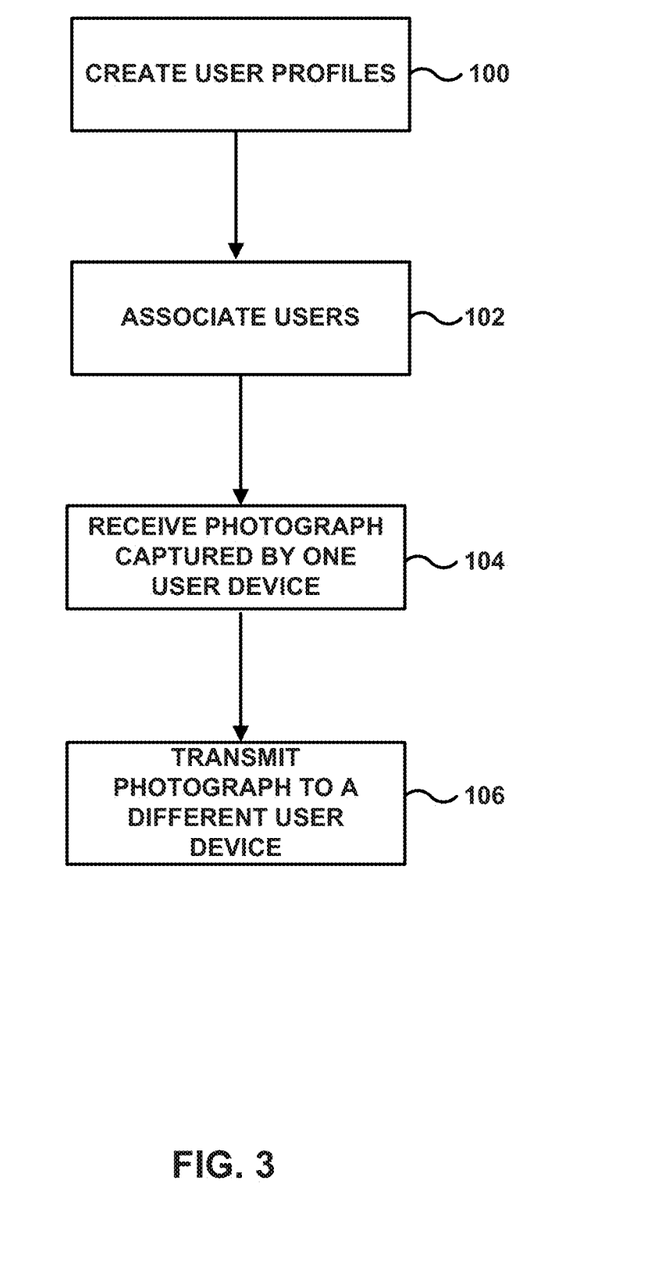
FIG. 3 is flow diagram of an example technique by which users may capture and share photographic images in the network-based environment of FIG. 1.

FIG. 3 is a flow diagram illustrating an example process by which a user can exchange photographs in a photograph exchange network environment such as photographic exchange network environment 2 (FIG. 2). For ease of description, the technique of FIG. 3 will be described with respect to photographic exchange network environment 2 (FIG. 1) and photographic exchange network server 20 (FIG. 2). The technique of FIG. 3 can be performed using other network environment and computer hardware configurations, and it should be appreciated that the disclosure is not limited in this respect.

The technique of FIG. 3 includes having each of a plurality of users create a user profile that is stored in database 28 of sever 20 (100). Each user profile may include information that identifies the user and allows the user to be physically identified by other network participants. For example, each user profile may include a stored image of a user (e.g., a head shot image of the user's face), status information about the user, physical description information about the user, and any other desired information. User profile information may be received from each of the plurality of users and stored on server 20 or another computing device communicatively coupled to server 20.

Subsequent to creating user profiles for each of a plurality of different users, user location and association module 30 associates different users together into photographic image sharing groups (102). User location and association module 30 may receive physical location information from mobile devices (e.g., mobile phones, tablet computers) carried by the plurality of users and associate users into different groups based on their relative physical location with one another. For example, user location and association module 30 may receive GPS coordinates determined by a GPS of each mobile device. As another example, user location and association module 30 may receive location information generated when a user checks-in or otherwise identifies their location through an application which, in turn, communicates with user location and association module 30.

In addition to or in lieu of associating different users together into photographic image sharing groups based on physical location, user location and association module 30 may receive data indicating that a certain group of users should be associated together and may associate users together based on the received indication. For example, an individual may set up a photographic event such as a wedding, birthday, party, or the like and allow certain network user to join the photographic event. All users joining the event may be associated together as a group to enable photographic exchange among the group.

After associating different users together as a photographic image sharing group (102), photographic exchange module 34 may receive a photograph taken by one individual (104) and transmit the photograph to a different individual (106). During operation, user profiles of individuals associated with a particular user in a photographic exchange group may be displayed on a display screen of a mobile device carried by the user. The user may select one of the profiles and the selection may be transmitted from the mobile device to photographic exchange module 34. The user may subsequently engage a camera on their mobile device to take a photographic image of an individual or event corresponding to the individual whose user profile was selected by the user. The photographic image may transfer from the mobile device to photographic exchange module 34. Upon receipt, photographic exchange module may transfer the photographic image to a device (e.g., mobile device) of the user whose profile was selected by the picture taker. The individual receiving the photographic image may display the image on their mobile device and, in different examples, select options to delete the image, save the image, share the image, or modify the image. In this manner, photographic network exchange environment 2 may facilitate photographic sharing from one individual to another individual.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or with in separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a non-transitory computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various examples have been described. These and other examples are within the scope of the following claims.

The invention claimed is:

1. A method comprising:
receiving, by one or more processors, an indication of a physical location of a first user;
responsive to receiving the indication of the physical location of the first user, determining, by the one or more processors, at least a second user at the physical location of the first user;
transmitting, by the one or more processors, information identifying the first user to a mobile device associated with the second user;
and subsequent to transmitting information identifying the first user, receiving, by the one or more processors, an image of the first user from the mobile device associated with the second user, wherein the image is captured by the second user at the physical location, and wherein receiving the image of the first user from the mobile device associated with the second user comprises terminating access to and ownership of the image by the second user such that access to and ownership of the image is transferred to the first user and the second user does not retain a copy of the image;
further comprising providing, by the one or more processors, a prompt on a user device associated with the first user instructing the first user to at least one of keep the image or discard the image on the device associated with the first user.

2. The method of claim 1, wherein the indication of the physical location comprises location information determined by a global positioning system of a mobile device carried by the first user.

3. The method of claim 1, wherein the indication of the physical location comprises an indication generated in response to a user input to a mobile device carried by the first user identifying that the user has arrived at the physical location.

4. The method of claim 1, wherein the physical location is a room of a building.

5. The method of claim 1, wherein the information identifying the first user comprises a stored image of the first user.

6. The method of claim 1, further comprising, subsequent to receiving the image of the first user, transmitting the image, by the one or more processors, to the mobile device associated with the first user.

7. The method of claim 1, further comprising, subsequent to receiving the image of the first user, associating the image, by the one or more processors, with a user profile associated with the first user.

8. The method of claim 1, further comprising modifying, by the one or more processors, a user profile associated with the first user to reflect a change in at least one of a number of reward points associated with the first user and a celebrity status of the first user.

9. The method of claim 8, further comprising modifying, by the one or more processors, a user profile associated with the second user to reflect a change in at least one of a number of reward points associated with the second user and a celebrity status of the second user.

10. The method of claim 1, further comprising issuing, by the one or more processors, a notification to at least one of the first user and the second user of a reward opportunity associated with a particular physical location.

11. The method of claim 10, further comprising issuing, by the one or more processors, a notification to at least one of the first user and the second user of reward associated with an action to be performed at the particular physical location.

12. A system comprising:
a first mobile computing device, the first mobile computing device including first image capture means and first location identification means;
a second mobile computing device, the second mobile computing device including second image capture means and second location identification means;
a server device that is configured to:
receive an indication of a physical location of the first mobile computing device from the first location identification means;
receive an indication of a physical location of the second mobile computing device from the second location identification means;
determine if the first mobile computing device is at a same physical location as the second mobile computing device;
responsive to determining the first mobile computing device is at the same physical location as the second mobile computing device, transmit information identifying a first user to the second mobile computing device;
receive an image captured by the second image capture means of the second mobile computing device, wherein receiving the image comprises terminating access to and control of the image by the second mobile computing device such that the second mobile computing device does not retain a copy of the image;
and transmit the image to first mobile computing device;
a network communicatively coupling the first mobile computing device, the second mobile computing device, and the server device; wherein the information identifying the first user comprises a stored image of the first user, and wherein the server device is further configured to cause the first mobile computing device to issue a prompt that prompts a user of the first mobile computing device to at least one of keep the image or discard the image on the first mobile computing device.

13. The system of claim 12, wherein the image is of the first user.

14. The system of claim 12, wherein the server device is further configured, responsive to determining the first mobile computing device is at the same physical location as the second mobile computing device, to transmit information identifying a second user to the first mobile computing device.

15. The system of claim 12, wherein the first location identification means and the second location identification means comprise a global positioning system.

16. The system of claim 12, wherein the server device is configured to determine that the first mobile computing device is at the same physical location as the second mobile computing device if the first mobile computing device is within a set distance from the second mobile computing device, the first mobile computing device is in a same enclosed physical structure as the second mobile computing device, or the first mobile computing device is in a same geographical region as the second mobile computing device.

17. The system of claim 12, wherein the server device is further configured to modify a user profile associated with a user of at least one of the first mobile computing device and the second mobile computing device to reflect a change in a number of reward points associated with the user or a celebrity status of the user.

18. The system of claim 12, wherein the server device is further configured to modify a user profile associated with a user of at least one of the first mobile computing device and the second mobile computing device to reflect a change in celebrity status of the user.

* * * * *